(12) United States Patent
Svendsen

(10) Patent No.: US 9,734,072 B2
(45) Date of Patent: Aug. 15, 2017

(54) MAIN MEMORY PREFETCH OPERATION AND MULTIPLE PREFETCH OPERATION

(71) Applicant: APPLIED MICRO CIRCUITS CORPORATION, Sunnyvale, CA (US)

(72) Inventor: Kjeld Svendsen, Sunnyvale, CA (US)

(73) Assignee: MACOM CONNECTIVITY SOLUTIONS, LLC, Lowell, MA (US)

( * ) Notice: Subject to any disclaimer, the term of this patent is extended or adjusted under 35 U.S.C. 154(b) by 170 days.

(21) Appl. No.: 14/666,771

(22) Filed: Mar. 24, 2015

(65) Prior Publication Data

US 2016/0283383 A1    Sep. 29, 2016

(51) Int. Cl.
G06F 12/00 (2006.01)
G06F 3/00 (2006.01)
G06F 12/0862 (2016.01)

(52) U.S. Cl.
CPC .. *G06F 12/0862* (2013.01); *G06F 2212/6026* (2013.01)

(58) Field of Classification Search
CPC ........... G06F 12/0862; G06F 2212/602; G06F 2212/6022; G06F 2212/6026; G06F 9/3802; G06F 9/3804; G06F 12/0855
USPC .................. 711/137, 140
See application file for complete search history.

(56) References Cited

U.S. PATENT DOCUMENTS

| | | | |
|---|---|---|---|
| 5,941,981 A * | 8/1999 | Tran ........................ | G06F 9/383 711/137 |
| 8,595,554 B2 | 11/2013 | Bellofatto et al. | |
| 8,745,604 B1 | 6/2014 | Agarwal | |
| 8,832,485 B2 | 9/2014 | Branover et al. | |
| 8,892,821 B2 | 11/2014 | Arimilli et al. | |
| 8,930,627 B2 | 1/2015 | Alexander et al. | |
| 8,972,666 B2 | 3/2015 | Alexander et al. | |
| 2008/0071954 A1 | 3/2008 | Drerup et al. | |
| 2010/0262778 A1 * | 10/2010 | Cargnoni ............ | G06F 12/0811 711/118 |
| 2011/0072218 A1 | 3/2011 | Manne et al. | |
| 2012/0066455 A1 | 3/2012 | Punyamurtula et al. | |
| 2013/0254485 A1 * | 9/2013 | Kannan ............... | G06F 12/0862 711/122 |
| 2014/0052927 A1 | 2/2014 | McCauley et al. | |
| 2014/0101388 A1 * | 4/2014 | McCauley .......... | G06F 12/0862 711/137 |
| 2014/0281232 A1 * | 9/2014 | Hagersten ........... | G06F 12/0862 711/119 |

FOREIGN PATENT DOCUMENTS

EP        2778932        9/2014

OTHER PUBLICATIONS

International Search Report & Written Opinion for PCT Application Serial No. PCT/US2015/042596, mailed Feb. 2, 2016, 12 pages.

* cited by examiner

*Primary Examiner* — Sean D Rossiter
(74) *Attorney, Agent, or Firm* — Amin, Turocy & Watson LLP

(57) ABSTRACT

Provided is an integrated circuit that includes a first prefetcher component communicatively coupled to a processor and a second prefetcher component communicatively coupled to the memory controller. The first prefetcher component configured for sending prefetch requests to the memory controller. The second prefetcher component configured for accessing prefetch data based on the prefetch request and storing the prefetch data in a prefetch cache of the memory controller.

18 Claims, 8 Drawing Sheets

MAIN MEMORY PREFETCH OPERATION AND MULTIPLE PREFETCH OPERATION

TECHNICAL FIELD

The subject disclosure relates generally to electronic circuits and, more particularly, to a main memory prefetch operation and multiple prefetch operations.

BACKGROUND

In electronic circuits, the processing speed of microprocessors tends to be faster than the processing speed of the memory where a program is stored. Thus, the instructions for the program are read at a speed that is slower than the mircoprocessor speed and the microprocessor has to wait for the instructions to be read.

In an attempt to alleviate the wait situation, an instruction prefetch (e.g., a prefetch operation) can be used to speed up the amount of time (e.g., a wait state) needed to perform various operations (e.g., load programs, execute a program, and so on). During the prefetch operation, files expected to be needed for the various operations are cached in advance of when each file is expected to be used for the various operations.

The prefetch operation can occur when a processor requests an instruction from the main memory, which is before the processor needs the instruction. The prefetch operation can be performed because programs are usually executed sequentially and, thus, the instructions can be prefetched in the program order. When the pre-requested instruction (e.g., prefetched instruction) is received from the memory, the instruction is placed in a cache. When the processor is ready for the instruction, the processor can access the instruction from the cache. This process is quicker than what would occur if the processer requested the instruction only when the instruction is needed, which would result in high latency while waiting for the memory to return the instruction.

Prefetching has been performed by a memory controller based prefetcher of a computer system. Thus, the memory controller has to track the address-streams from all the processors in the system. When a new process is added to the system, the memory controller based prefetcher has to be updated. Further, if the memory controller based prefetcher is split into multiple instances, the address-stream tracking can be complicated and in some instances rendered unworkable.

The above-described deficiencies of conventional approaches to prefetch operations are merely intended to provide an overview of some of the problems of conventional approaches and techniques, and are not intended to be exhaustive. Other problems with conventional circuits and techniques, and corresponding benefits of the various non-limiting embodiments described herein may become further apparent upon review of the following description.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

An aspect relates to a system that includes first prefetcher component communicatively coupled to a processor. The first prefetcher component can be configured for sending a prefetch request to a memory controller. The system can also include a second prefetcher component communicatively coupled to the memory controller. The second prefetcher component can be configured for accessing prefetch data based on the prefetch request and storing the prefetch data in a prefetch cache of the memory controller.

Another aspect relates to a method that includes receiving, by a slave prefetch component, a prefetch request from a master prefetch component. The method also includes accessing, by the slave prefetch component prefetch data based on the prefetch request. Further, the method includes storing, by the slave prefetch component, the prefetch data in a prefetch cache of a memory controller Yet another aspect relates to an integrated circuit that includes a first prefetcher component communicatively coupled to a processor. The first prefetcher component configured for sending prefetch requests to a memory controller. The integrated circuit can also include a second prefetcher component communicatively coupled to the memory controller. The second prefetcher component configured for accessing prefetch data based on at least one prefetch request of the prefetch requests and storing the prefetch data in a prefetch cache of the memory controller.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Various non-limiting embodiments are further described with reference to the accompanying drawings in which.

DETAILED DESCRIPTION

Figure 1:
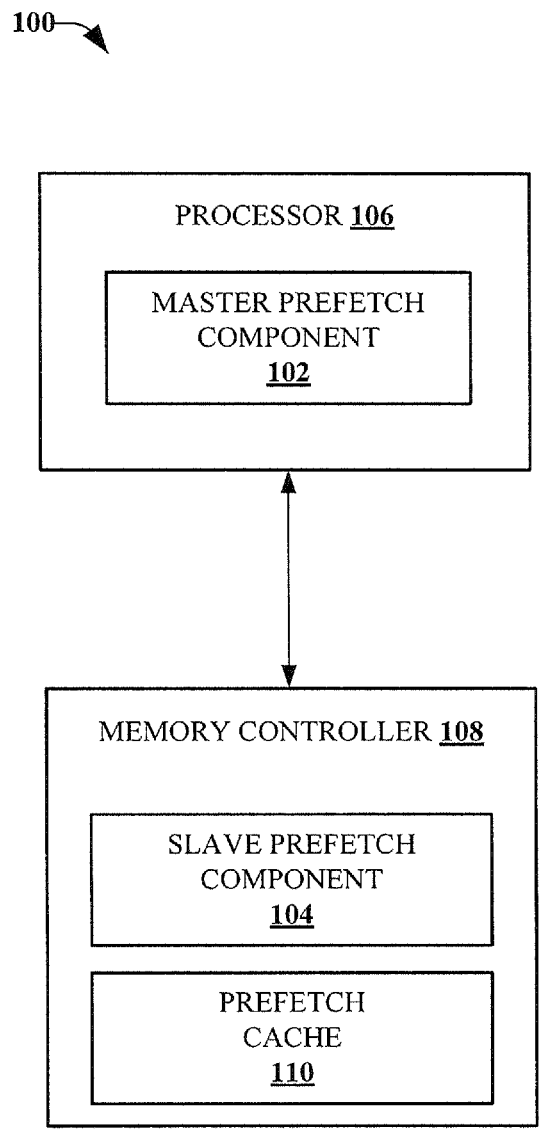
FIG. 1 illustrates an example, non-limiting main memory prefetch system, according to an aspect.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, can be arranged, substituted, combined, separated, and designed in a wide variety of different configurations, all of which are explicitly contemplated herein.

Various aspects discusses herein relate to main memory prefetching. The terms "prefetching," "prefetch," and variants thereof as used herein, refers to an instruction prefetch or a prefetch operation. The various disclosed aspects can be utilized to overcome various challenges associated with prefetchers used with traditional systems and methods. For example, some methods employ a memory controller based prefetcher and, therefore, the prefetcher for a memory controller cache is solely located in the memory controller. There are a number of challenges associated with this type of prefetching scheme. For example, in a multi-processor system the memory controller prefetcher is required to monitor (e.g., keep track of) address-streams from all processors in the system. Such an approach to prefetch operations can encounter a severe design complication that can negatively impact logic complexity, design frequency of operations, area consumption, and/or power consumption.

Another challenge of a multi-processors system can be that if the number of processors is increased (by allocation or new design), the memory controller prefetcher requires a design update to accommodate the processors count increase. This is a design complication that can cause the design not to be readily scalable.

Yet another challenge of multi-processors systems can be that if the memory controller is split into multiple instances, the prefetcher address-pattern tracking can be complicated. At worst case, the prefetchers address-pattern tracking can be rendered non-workable, which renders the prefetcher useless. Further, if the memory controller is split into multiple instances and address-hashing is used to determine the (memory controller) destination of the memory request, prefetcher address-tracking can be essentially rendered impossible.

An alternative approach of traditional systems for performing the prefetch operations is to place the memory controller prefetcher solely in the processor. This can alleviate the above-mentioned challenges associated with some prefetchers, but presents a different set of issues.

For example, a challenge with such systems can be that a processor based memory controller prefetcher might not be able to determine the constraints of the memory accessed. This can make it difficult (if not impossible) to determine whether to prefetch (or not) from the memory controller perspective, which can lead to overall performance degradation.

Further, without a prefetcher in the memory controller, the memory controller cannot be directed (e.g., instructed) to conduct prefetches beyond the requests from the processor. This can impact bus/interconnect bandwidth since all prefetch requests must be sent separately from regular loads over the process-memory controller interconnect.

Therefore, an aspect disclosed herein relates to main memory prefetching that can be performed in a simple and scalable manner. Further, the disclosed aspects can simplify overall system and subcomponent design, which can enable a more efficient system. Such efficiency can be realized in terms of throughput, latency, frequency of operation, and power consumption.

According to an implementation, various aspects relate to attaching prefetch hints to prefetch requests. The hints can allow a memory subsystem prefetcher to conduct prefetches beyond a simple prefetch. For example, the prefetch hint information can be provided at substantially the same time as the prefetch request. The prefetch hint information can indicate count and stride prefetch for additional prefetches. A stride prefetch (or simply stride) can be used to eliminate a compulsory miss and/or a capacity miss. Thus, the stride prefetch can be used to predict a next address to prefetch. For example, if a memory address is missed, an address that is offset by a defined distance from the missed address is likely to be missed in the future. According to some implementations, when there is a hit to an address, an address that is offset by a distance from the hit address is also prefetched. These types of prediction can be useful for stride access. The count relates to the number of loads ahead to fetch (e.g., two loads ahead, three loads ahead, five loads ahead, six loads ahead, and so on). Thus, a determined number of loads, in addition to a current load, can be prefetched.

The utilization of prefetch hints can consume a lower amount of request bandwidth (as compared to not using prefetch hints) on a global interconnect system. Additionally, multiple prefetch operations can be specified in a single operation, further reducing the amount of request bandwidth that needs to be utilized.

Various aspects also relate to fusing loads (e.g., reads) to a memory subsystem with prefetches in a single operation, which can enable prefetch request generation to be performed in a request agent. Further, fusing loads can simplify system-wide prefetching in a multi-processor system and can utilize lower request bandwidth (as compared to not fusing loads) in distributed main memory subsystems. Thus, a lower request bandwidth is needed on a global interconnect system since load and multiple prefetch operations can be specified in a single operation. Further, this can allow hash based (or another type of) distributed memory controllers on multiple buses. This is because a local memory subsystem unit might not see stride patterns since the prefetcher can reside in a request agent.

FIG. 1 illustrates an example, non-limiting main memory prefetch system 100, according to an aspect. The main memory prefetch system 100 can be configured to provide a simplified prefetch architecture for main memory as compared to traditional prefetcher systems. Further, the main memory prefetch system 100 can be scalable such that any number of processor can be added (or removed) from the main memory prefetch system 100.

Loads (e.g., data fetches) from slower memories (e.g., double data rate (DDR), disks, and so on) tend to be spatial (e.g., closely related in space) and temporal in nature. Prefetching attempts to take advantage of the spatial nature of loads (e.g., loads closely related in (address) space). Thus, for address streams there is a likelihood that a load to memory address A is followed by a load to address A+N, where N is a stride and can be any arbitrary integer, and, thus, by induction loads likely to occur in strides to addresses A+N*m, where m represents the amount of loads ahead and is an arbitrary signed integer.

Further, loads to slower memories tend to incur a significant latency from the requesting agent to the memory agent, and loads consume bandwidth on the request bus interconnect structure. Requesting agents (e.g., processors (CPUs)), may attempt to circumvent the long latencies incurred by the interconnect structure and the slowness (long latency access) of the memories, by using prefetching (e.g., issuing loads speculatively in advance so the data is made available earlier than if just requesting the data when actually needed). However, this prefetch data is usually stored in the request agent (e.g., in a cache structure), which can lead to resource conflicts and upsets (e.g., cache trashing) mainly due to limitation of such (e.g., CPU) cache structures in terms of capacity. This can effectively limit the amount of prefetching which can be performed, since too much prefetching can lead to unnecessary data to be prefetched and thus, agent cache trashing.

Thus, a larger cache structure can be implemented in the memory subsystem (memory controller). With a prefetch cache in the memory controller, a challenge is how to design the prefetcher for this cache. As discussed above, several problems arise in this context.

To overcome the above as well as other issues associated with traditional systems, the main memory prefetch system 100 can be configured such that a prefetcher is divided into a master-slave arrangement. For example, a prefetcher can be split into two (or more) sections or components, namely a master prefetch component 102 and a slave prefetch component 104. The master prefetch component 102 can be communicatively coupled to a processor 106. Further, the slave prefetch component 104 can be communicatively coupled to a memory controller 108. Coupling can include various communications including, but not limited to, direct communications, indirect communications, wired communications, and/or wireless communications.

Thus, a first functionality associated with a prefetch operation can be performed by the master prefetch component 102 and a second functionality associated with the prefetch operation can be performed by the slave prefetch component 104 (and/or one or more other slave prefetch components).

The master prefetch component 102 can be configured to send prefetch requests to the memory controller 108 (e.g., to the slave prefetch component 104). According to some aspects, the master prefetch component 102 can be configured to determine a stride and lock onto access patterns for the prefetch operation.

The slave prefetch component 104 can use the request from the master prefetch component 102 to access a memory of the slave prefetch component 104 (or the memory controller 108, or another system component) to obtain the prefetch data. Once accessed, the prefetch data can be placed in a prefetch cache 110 of the memory controller 108.

It is noted that although a single master prefetch component 102 and a single slave prefetch component 104 are illustrated and described, the prefetcher can be divided into any number of slave prefetchers. For example, a single master prefetch component 102 can interface with multiple slave prefetchers (e.g., the slave prefetch component 104, a third slave prefetcher component, a fourth slave prefetcher component, a fifth slave prefetcher component, and so on). Each subsequent slave prefetcher component can be communicatively coupled to respective subsequent memory controllers. Further, for implementations that employ more than one slave prefetcher, respective functionalities associated with a prefetch operation can be performed by one or more of the subsequent slave prefetchers.

Figure 2:
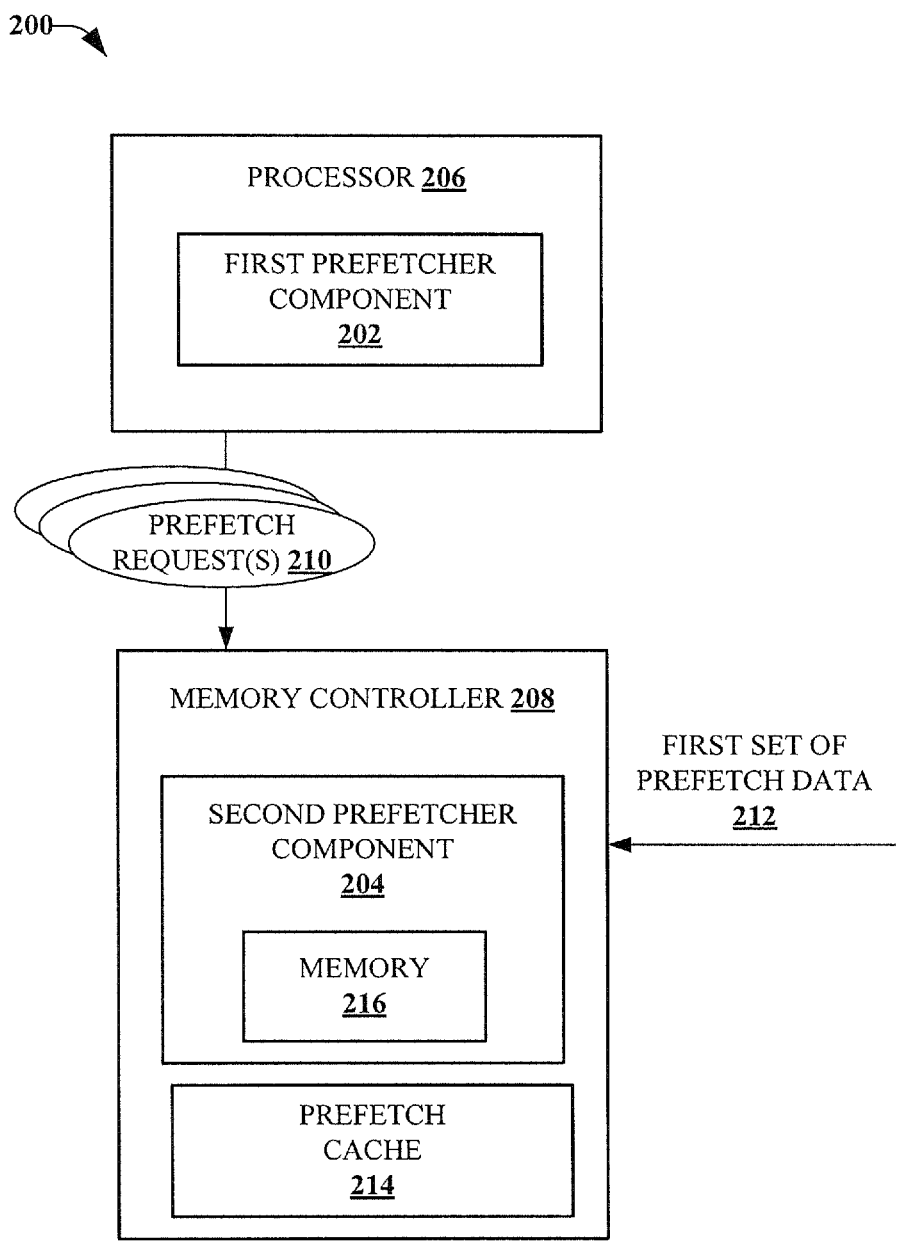
FIG. 2 illustrates another example, non-limiting system, according to an aspect.

FIG. 2 illustrates another example, non-limiting system 200, according to an aspect. The system 200 can be configured to perform main memory prefetching in a simple and scalable manner. Further, the system 200 can be configured to simplify overall system and subcomponent design, which can enable a more efficient system in terms of throughput, latency, frequency of operation, power, and so forth.

Included in the system 200 can be a first prefetcher component 202 (e.g., the master prefetch component 102 of FIG. 1) and a second prefetcher component 204 (e.g., the slave prefetch component 104 of FIG. 1). The first prefetcher component 202 and at least the second prefetcher component 204 can be individual components that are formed based on separation (or division) of a prefetcher into two or more components. For example, the first prefetcher component 202 can be communicatively coupled to a processor 206 and the second prefetcher component 204 can be communicatively coupled to a memory controller 208. It is noted that although not shown or described, additional prefetcher components, communicatively coupled to respective additional memory controllers, can be included in the system 200. However, these additional prefetcher components and memory controllers are not shown or described for purposes of simplicity.

The first prefetcher component 202 can be configured to send one or more prefetch requests 210 to the memory controller 208. The one or more prefetch requests 210 can be instruction prefetches. It is noted that the one or more prefetch requests 210 can be sent at different times, depending on the instructions that are expected to be needed in the future for processing.

The second prefetcher component 204 can be configured to access a first set of prefetch data 212 based, at least in part, on the one or more prefetch requests 210. The first set of prefetch data 212 retrieved by the second prefetcher component 204 can be stored in a prefetch cache 214 of the memory controller 208.

According to an implementation, the second prefetcher component 204 can be configured to retrieve the first set of prefetch data 212 prior to receiving a prefetch request from the first prefetcher component 202. Further to this implementation, the first set of prefetch data 212 can be stored in a memory 216 of the second prefetcher component 204. At about the same time as a prefetch request for the first set of prefetch data 212 is received from the first prefetcher component 202, the first set of prefetch data 212 can be moved from the memory 216 to the prefetch cache 214.

Figure 3:
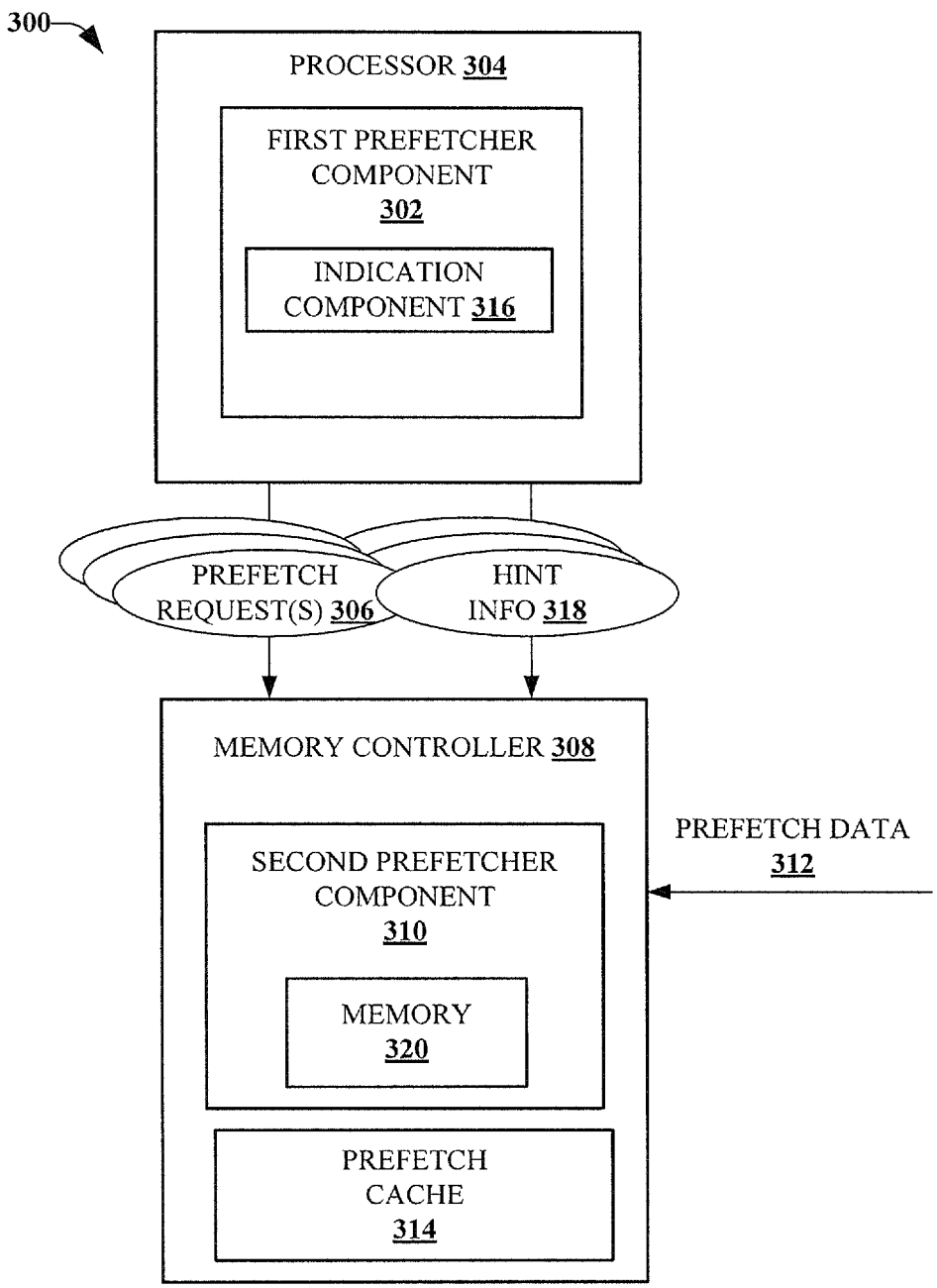
FIG. 3 illustrates an example, non-limiting system configured to conduct prefetches based on prefetch hints, according to an aspect.

FIG. 3 illustrates an example, non-limiting system 300 configured to conduct prefetches based on prefetch hints, according to an aspect. For example, system 300 can be configured to perform multiple operation prefetches, according to an aspect. The system 300 can be configured such that a larger cache structure can be implemented in a memory subsystem. Further, the system 300 can be configured to overcome various challenges associated with traditional prefetch operations.

According to some methods, a requesting agent issues separate loads and prefetches. These separate loads and prefetches can consume extra (e.g., around twice as much) request bandwidth on the interconnect structure as compared to one or more of the aspects disclosed herein.

According to another method, the prefetcher is located in the memory subsystem, which complicates the prefetcher in multi-processor systems because it needs support for each request agent and can cause lack of immediate scalability. Further, the prefetcher located in the memory subsystem can effectively prevent a distributed memory subsystem approach, which can complicate the memory subsystem design in high-performance systems.

Therefore, in accordance with an aspect discussed herein, a prefetch component for a memory controller cache can be split between a central processing unit and one or more memory controllers, with the main prefetching capability located in the central processing unit. Thus, the system 300 can require lower request bandwidth on a global interconnect system, as compared to other systems. The lower request bandwidth can be facilitated by the system 300 based on specifying multiple prefetch operations in a single operation.

The system 300 can include a first prefetcher component 302 communicatively coupled to a processor 304. The first prefetcher component 302 can be configured to send a prefetch request 306 (or multiple prefetch requests) to a memory controller 308. A second prefetcher component 310 can be communicatively coupled to the memory controller 308. The second prefetcher component 310 can be configured to access prefetch data 312 based on the prefetch request 306. Further, the second prefetcher component 310 can be configured to store the prefetch data 312 in a prefetch cache 314 of the memory controller 308.

According to an implementation, the first prefetcher component 302 can include an indication component 316 that can be configured to provide hint information 318 that can be utilized by the second prefetcher component 310. The hint information 318 can comprise stride information and data related to how many loads ahead the second prefetcher component 310 should prefetch. According to some implementations, the hint information 318 is attached to the prefetch request 306.

The second prefetcher component 310 can be configured to conduct prefetches based on the hint information 318 (e.g., prefetch hints) attached to regular memory loads from the processor 304, according to an implementation. This can save separate prefetch requests from the CPU(s) (e.g., the processor 304), which can save request bandwidth on the CPU-MC (central processing unit-memory controller) interconnect leading to overall better system performance.

The pre-prefetched data retrieved based on the prefetch hint(s) can be stored in a memory 320 of the second prefetcher component 310. When a subsequent prefetch request is received from the first prefetcher component 302, the pre-prefetched data can be moved from the memory 320 to the prefetch cache 314.

The CPU can issue loads and specific prefetch requests with hint information to the memory controller prefetcher (e.g., the second prefetcher component 310). These hints can include stride (N), and for how many loads ahead (m). As discussed above, a stride prefetch (or simply stride) can be used to eliminate a compulsory miss and/or a capacity miss. Thus, the stride prefetch can be used to predict a next address to prefetch. For example, if a memory address is missed, an address that is offset by a defined distance from the missed address is likely to be missed in the future. According to some implementations, when there is a hit to an address, an address that is offset by a distance from the hit address is also prefetched. These types of prediction can be useful for stride access. The count relates to the number of loads ahead to fetch (e.g., two loads ahead, three loads ahead, five loads ahead, six loads ahead, and so on). Thus, a determined number of loads, in addition to a current load, can be prefetched. This can lower the number of loads and prefetches that need to be sent over the interconnect. Further, this can lower request bandwidth usage.

Figure 4:
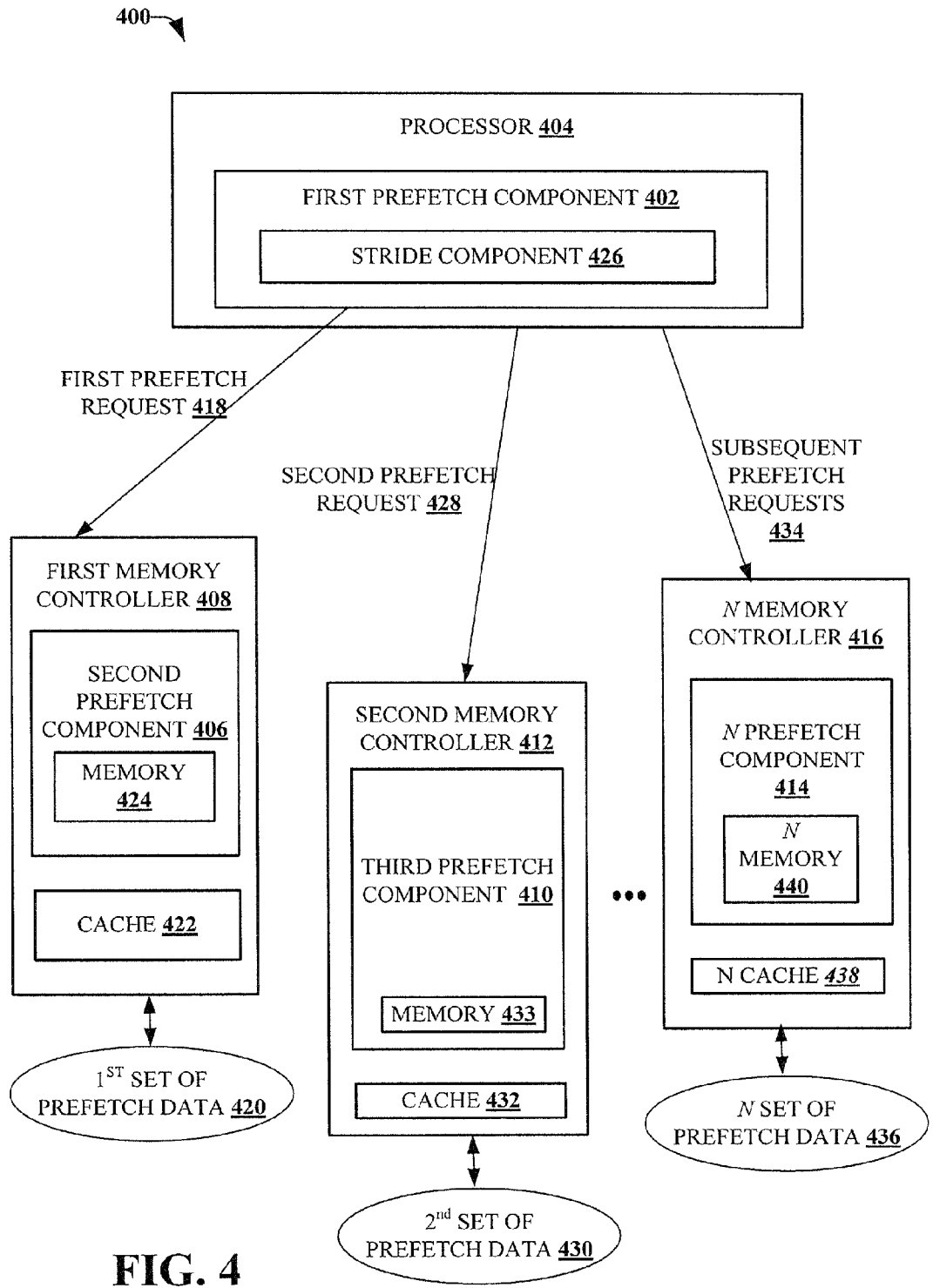
FIG. 4 illustrates another example, non-limiting main memory prefetch system, according to an aspect.

FIG. 4 illustrates another example, non-limiting main memory prefetch system 400, according to an aspect. Main memory prefetch system 400 can be configured as a main memory prefetching scheme. The various aspects discussed herein can alleviate the complications of scaling to additional (e.g., added) processors and/or memory controllers, and the complication resulting from the need for the (memory controller) prefetcher to track address-streams from multiple processors. Further, the various aspects can be configured for a reduction in the number of processors and/or memory controllers.

The main memory prefetch system 400 includes a first prefetch component 402 (e.g., master prefetch component 102 of FIG. 1) communicatively coupled to a processor 404. The main memory prefetch system 400 also includes a second prefetch component 406 (e.g., slave prefetch component 104 of FIG. 1) communicatively coupled to a first memory controller 408. Further, the main memory prefetch system 400 can include a third prefetch component 410 communicatively coupled to a second memory controller 412. In addition, any number of additional prefetch components (e.g., slave prefetch components) can be included in the main memory prefetch system 400, illustrated as a N prefetch component 414 communicatively coupled to N memory controller 416, where N is an integer.

It is noted that although the following is described with respect to the first prefetch component 402 and the second prefetch component 406, such aspects can additionally or alternatively apply to the third prefetch component 410 and subsequent prefetch components (N prefetch component 414).

The first prefetch component 402 can be configured to send a first prefetch request 418 to the first memory controller 408 (e.g., the second prefetch component 406). As discussed, in other implementations, the first prefetch request 418 can be sent to the second memory controller 412 (e.g. third prefetch component 410) and/or subsequent memory controllers (e.g., second memory controller 412 and/or N memory controller 416).

The second prefetch component 406, upon receiving the first prefetch request 418 from the first prefetch component 402, can be configured to access a first set of prefetch data 420. Further the second prefetch component 406 can be configured to store the first set of prefetch data 420 in a cache 422 (e.g., prefetch cache 110) of the first memory controller 408.

According to some implementations the second prefetch component 406 can be configured to retrieve the first set of prefetch data 420 prior to receiving the first prefetch request 418 from the first prefetch component 402. Further, the second prefetch component 406 can be configured to store the first set of prefetch data 420 in a memory 424 of the second prefetch component 406. Thereafter, when at least a portion of the first set of prefetch data 420 is requested in a subsequent prefetch request, the portion of the first set of prefetch data can be moved from the memory 424 to the cache 422, according to an aspect.

The first prefetch component 402 can include a stride component 426 that can be configured to determine a stride prefetch. For example, the stride prefetch can be type of prediction, wherein if a memory address is missed, an address that is offset by a distance from the missed address is likely to be missed in the near future. Thus, the stride prefetch can be used to mitigate compulsory/capacity misses. Further, the stride prefetch can be utilized such that when there is a hit in the buffer, an address that is offset by a distance from the hit address is also prefetched. The first prefetch component 402 can also be configured to lock onto access patterns.

According to some implementations, the third prefetch component 410 can be configured to receive a second prefetch request 428 from the first prefetch component 402. The third prefetch component 410 can be configured to retrieve a second set of prefetch data 430 and store the second set of prefetch data 430 in a cache 432 (e.g., prefetch cache) of the second memory controller 412.

In accordance with an implementation, the third prefetch component 410 can be configured to retrieve the second set of prefetch data 430 prior to receiving the second prefetch request 428. The second set of prefetch data 430 can be stored in a memory 433 of the third prefetch component 410.

At least a set of the second set of prefetch data 430 stored in the memory 433 can be moved from the memory 433 to the cache 423 when a subsequent prefetch request is received from the first prefetch component 402.

Further, subsequent prefetch requests 434 can be received at the N memory controller 416, from the first prefetch component 402. The N prefetch component 414 can be configured to retrieve a N set of prefetch data 436 and store the N set of prefetch data 436 in a N cache 438 (e.g., prefetch cache) of the N memory controller 416.

In accordance with an implementation, the N prefetch component 414 can be configured to retrieve the N set of prefetch data 436 prior to receiving the subsequent prefetch requests 434 from the first prefetch component 402. The N set of prefetch data 436 can be stored in a N memory 440 of the N prefetch component 414. When a request for at least a subset of the set of prefetch data 436 is received in another prefetch request, the subset can be moved from the N memory 440 to the N cache 438.

Thus, the main memory prefetch system 400, through utilization of prefetch hints, can consume a lower amount of request bandwidth (as compared to not using prefetch hints) on a global interconnect system. Additionally, multiple prefetch operations can be specified in a single operation, further reducing the amount of request bandwidth that needs to be utilized.

Figure 5:
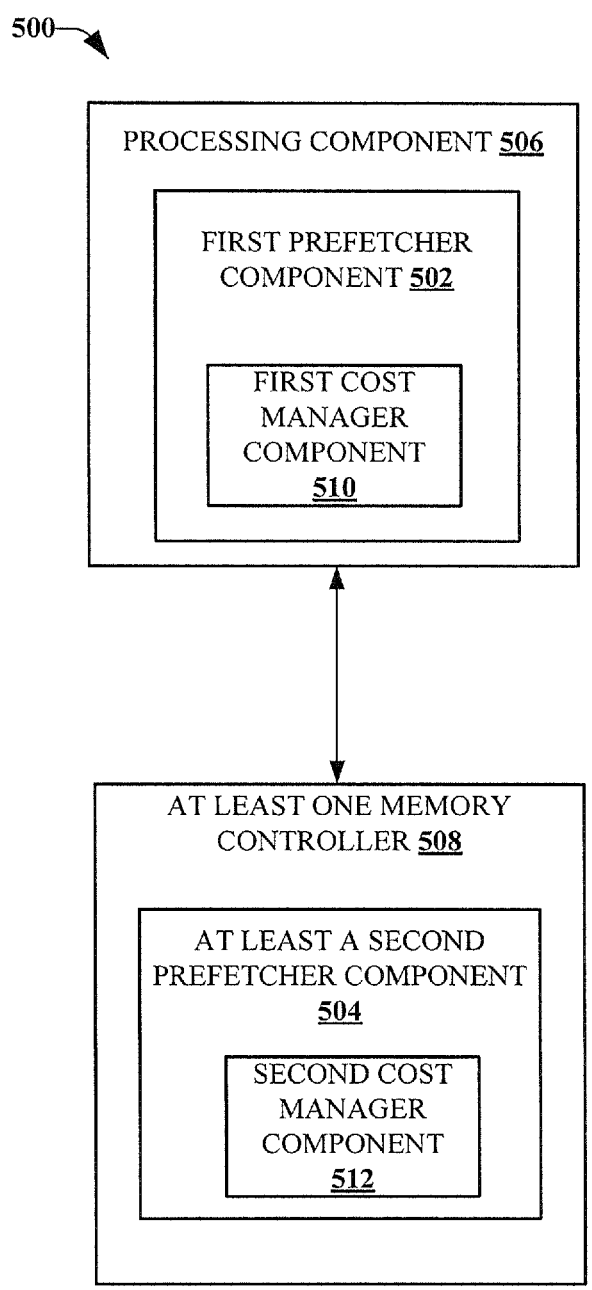
FIG. 5 illustrates an example system for prefetch requests, according to an aspect.

FIG. 5 illustrates an example system 500 for prefetch requests, according to an aspect. The system 500 can be configured such that a larger cache structure can be implemented in the memory subsystem. A prefetcher could also be implemented at the memory subsystem level. However, if the memory subsystem is distributed, which can be performed for numerous reasons (e.g., capacity, bandwidth, Registration, Admission and Status (RAS)), a local memory subsystem prefetcher may not be able to determine the agent stride patterns. Thus, the prefetcher would have to reside in the request agent. With this implementation, regular loads, as well as prefetch loads, would have to traverse the interconnect. This consumes precious bandwidth, and can effectively consume about twice as much bandwidth as would be consumer if no prefetch was used.

To resolve the above noted deficiencies, system 500 can be configured to fuse regular loads with prefetch information. In this manner, only a single load might be issued on the interconnect. Further, the load can also hold prefetch information (e.g., if prefetching should be initiated or not initiated (hint)). If a prefetch should be initiated, information related to what stride (N), and for how many loads ahead (m) can be provided. Other hints could also be considered, according to an aspect.

For example, when a prefetch operation is performed, it may be determined that data is needed for a first address and, therefore, most likely data will be needed for a next address. Therefore, a prefetch hint can be added that indicates to prefetch to a load address and to a next address (as well as subsequent addresses). This can lower the bandwidth consumption on an innerconnect because, instead of separating the requests into separate operations, the prefetch requests (e.g., prefetch load address, next address, subsequent address) is fused into a single operation and, further the prefetched data is stored in a low energy cache.

System 500 can include a first prefetcher component 502 (e.g., master prefetch component 102 of FIG. 1, first prefetcher component 202 of FIG. 2, and so on) and at least a second prefetcher component 504 (e.g., first prefetcher component 202 of FIG. 1, second prefetcher component 204 of FIG. 2, and so on).

The first prefetcher component 502 can be communicatively coupled to a processing component 506; the second prefetcher component 504 can be communicatively coupled to at least one memory controller 508. Further, as previously discussed, additional second prefetcher components (e.g., more than one slave prefetch component) can be included in the system 500. However, for purposes of simplicity, only one slave prefetch component (e.g., the second prefetcher component 504) is illustrated and described.

The first prefetcher component 502 can be configured to transmit a prefetch request to the memory controller 508 (e.g., the second prefetcher component 504). Since prefetches are speculative and it is not guaranteed that a set (or subset) of data will be needed, according to an aspect, both the first prefetcher component 502 and the second prefetcher component 504 can be configured to independently determine the cost of performing a prefetch operation.

For example, the first prefetcher component 502 (e.g., the CPU or the processing component 506) can attempt to optimize a prefetch request based on the CPU resources, the cost of sending requests of the CPU-MC interconnect, or combinations thereof.

The second prefetcher component 504 can be configured to determine the cost of prefetching to a local cache (e.g., a cache of the slave prefetch component). The determination as to the cost of the prefetch (as well as whether to perform the prefetch) can be based on, but not limited to, memory controller cache capacity, cache fullness/use, and (DDR) memory constraints. For example, the DDR memory constraints can include the cost of accessing open pages and/or closed pages.

For example, the first prefetcher component 502 can include a first cost manager component 510 and the second prefetcher component 504 can include a second cost manager component 512. The first cost manager component 510 and the second cost manager component 512 can independently determine a cost of performing the prefetch.

For example, the first cost manager component 510 can be configured to determine a cost of performing the prefetch independent of another determination performed by the second cost manager component 512. In another example, the second cost manager component 514 can be configured to determine a cost of performing the prefetch independent of another determination performed by the first cost manager component 510.

According to an implementation, the first prefetcher component 502 can be configured to determine the prefetch request based on local resources and a cost of sending the prefetch request over an interconnect. For example, the first cost manager component 510 can determine the cost of sending the prefetch request over an interconnect.

According to another implementation, the second prefetcher component 504 (or the second cost manager component 512) can be configured to determine a cost of prefetching to a local cache associated with the memory controller. The cost can be determined by the second cost manager component 512 based on a cache capacity of the memory controller, a remaining capacity of the local cache, a memory constraint, or a combination thereof.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 6:
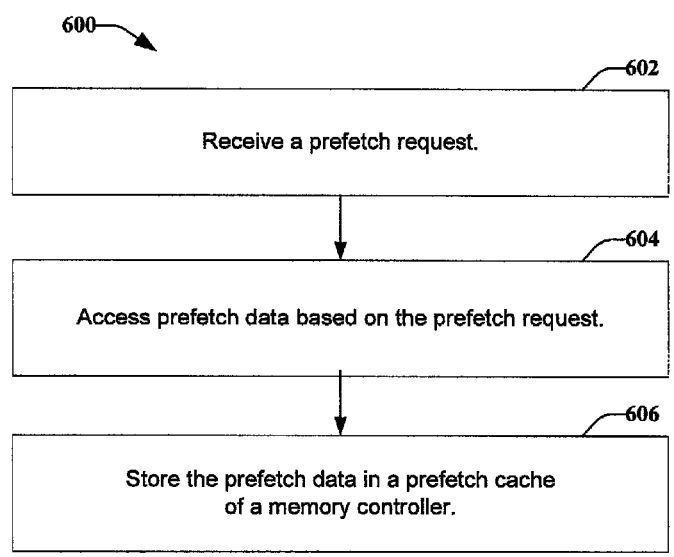
FIG. 6 illustrates an example, non-limiting method for a main memory prefetching scheme, according to an aspect.

FIG. 6 illustrates an example, non-limiting method 600 for a main memory prefetching scheme, according to an aspect. The method 600 can be implemented by an integrated circuit, according to an embodiment.

Method 600 starts, at 602, when a prefetch request is received. According to an implementation, the prefetch request can be received at a slave prefetch component. Further, the prefetch request could have been sent by a master prefetch component. The prefetch request can include a set of instruction prefetches. Further, more than one prefetch request can be sent at substantially the same time, or at different times.

At 604, prefetch data is accessed based on the prefetch request. For example, a memory of the slave prefetch component may be accessed to obtain the prefetch data. According to an implementation, at least a set of the prefetch data is retrieved prior to receiving the prefetch request.

At 606, the prefetch data is stored in a prefetch cache of a memory controller. For example, the memory controller can be associated with the slave prefetch component. In the implementation where at least a set of the prefetch data is retrieved prior to receiving the prefetch request, the prefetch data can be stored in a memory of the slave prefetcher component.

In an implementation, the method 600 can include determining a prefetch stride and locking onto access patterns. For example, the prefetch stride can be determined based on an address hit or an address miss. In another implementation, hint information can be associated with the prefetch requests. For example, the hint information can include stride information and data related to the number of loads ahead to fetch.

According to some implementations, the method 600 can include independently determining a cost of performing the prefetch. For example, the method 600 can include determining the prefetch request based on local resources and a cost of sending the prefetch request over an interconnect. In another example, the method can include determining a cost of prefetching to a local cache associated with the memory controller based on a cache capacity of the memory controller, a remaining capacity of the local cache, a memory constraint, or a combination thereof.

Figure 7:
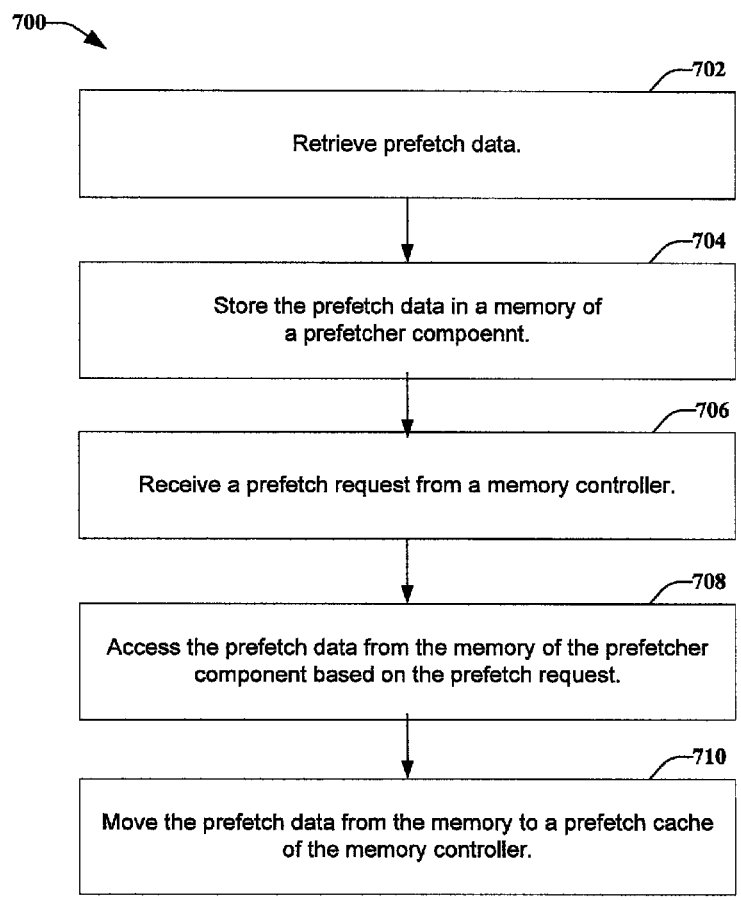
FIG. 7 illustrates an example, non-limiting method for pre-accessing prefetch data, according to an aspect.

FIG. 7 illustrates an example, non-limiting method 700 for pre-accessing prefetch data, according to an aspect. At 702, retrieve prefetch data. The prefetch data can be retrieved, in advance, based on a previous prefetch instruction received. For example, the previous prefetch instruction can include prefetch hint data or prefetch hint information. The prefetch hint information can comprise stride information and data related to a number of reads to fetch in additional to a current read. In another example, the previous prefetch instruction can include fused instructions (e.g., retrieve data at this address, retrieve data at a next address, and retrieve data at one or more subsequent addresses).

At 704, the prefetch data is stored in a memory of a prefetcher component. For example, the memory of the prefetcher component can be a temporary storage area for the prefetch data. If the prefetch data is not requested in a subsequent prefetch instruction, the prefetch data can be removed (e.g., deleted, evicted) from the memory of the prefetcher component.

A (subsequent) prefetch request can be received from a memory controller, at 706. Based on the prefetch request, the prefetch data can be retrieved from the memory of the prefetcher component, at 708, and moved from the memory to a prefetch cache of the memory controller, at 710.

As discussed herein, various aspects can relate to an integrated circuit that can include a first prefetcher component and a second prefetcher component. The first prefetcher component can be communicatively coupled to a processor. Further, the first prefetcher component can be configured for sending prefetch requests to a memory controller. The second prefetcher component can be communicatively coupled to the memory controller. Further, the second prefetcher component can be configured for accessing prefetch data based on at least one prefetch request of the prefetch requests and storing the prefetch data in a prefetch cache of the memory controller.

Further to this aspect, integrated circuit can include a third prefetcher component communicatively coupled to another memory controller. The third prefetcher component can be configured for accessing other prefetch data based on a second prefetch request of the prefetch requests. In addition, the third prefetcher component can be configured for storing the other prefetch data in another prefetch cache of the other memory controller.

Alternatively or additionally, the first prefetcher component can be further configured for determining a cost of performing a prefetch operation based on the prefetch requests independent of another determination performed by the second prefetcher component.

As discussed, provided herein is a main memory prefetching that can be performed in a simple and scalable manner. Further, the disclosed aspects can simplify overall system and subcomponent design, which can enable a more efficient system. Such efficiency can be realized in terms of throughput, latency, frequency of operation, and power consumption.

Example Computing Environment

Figure 8:
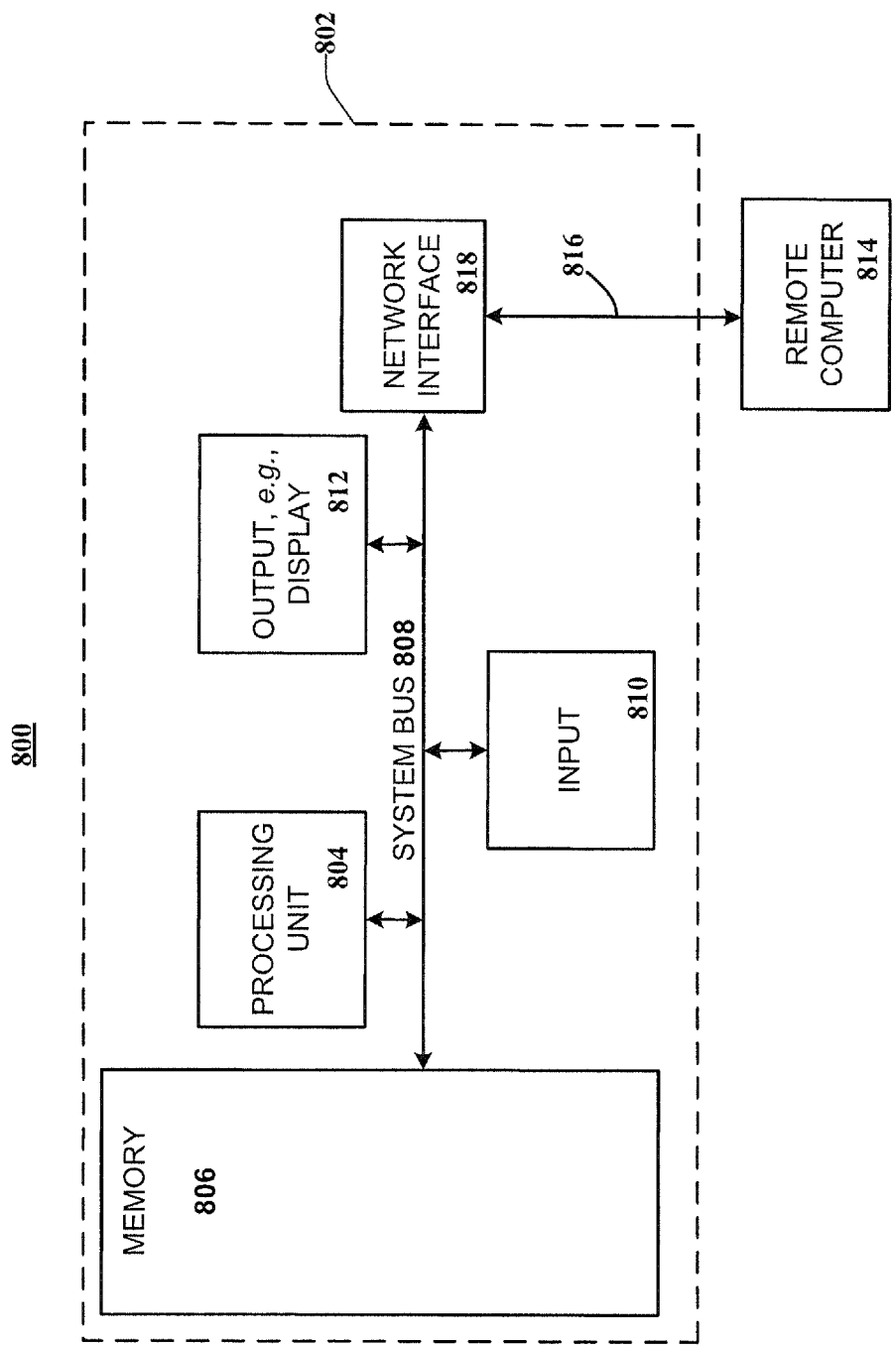
FIG. 8 illustrates a block diagram of an example data communication network that can be operable in conjunction with various aspects described herein.

The techniques described herein can be applied to any device and/or network that utilizes a processor, such as a central processing unit, and one or more memory controllers. It is to be understood, therefore, that handheld, portable and other computing devices and computing objects of all kinds are contemplated for use in connection with the various non-limiting embodiments, e.g., anywhere that a device may wish to implement a prefetch instruction or prefetch operation for a multiprocessor system. Accordingly, the below general purpose remote computer described below in FIG. 8 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 8 illustrates a block diagram of an example electronic computing environment that can be implemented to facilitate a main memory prefetch operation and/or multiple prefetch operations in conjunction with one or more aspects described herein. FIG. 8 therefore illustrates an example of a suitable computing system environment 800 in which some aspects of the disclosed subject matter can be implemented, although as made clear above, the computing system environment 800 is only one example of a suitable computing environment for a device and is not intended to suggest any limitation as to the scope of use or functionality of the disclosed subject matter. Neither should the computing system environment 800 be interpreted as having any dependency or requirement relating to any one or combination of components illustrated in the exemplary operating environment or computing system environment 800.

With reference to FIG. 8, an exemplary device for implementing the disclosed subject matter includes a general-purpose computing device in the form of a computer 802. Components of computer 802 may include, but are not limited to, a processing unit 804, a memory 806, and a system bus 808 that couples various system components including the system memory to the processing unit 804. The system bus 808 may be any of several types of bus structures including a memory bus or memory controller, a peripheral bus, and a local bus using any of a variety of bus architectures.

Computer 802 typically includes a variety of computer readable media. Computer readable media can be any available media that can be accessed by computer 802. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, compact disk read only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 802.

Communication media typically embodies computer readable instructions, data structures, program modules, or other data in a modulated data signal such as a carrier wave or other transport mechanism and includes any information delivery media.

The memory 806 may include computer storage media in the form of volatile and/or nonvolatile memory such as ROM and/or RAM. A basic input/output system (BIOS), containing the basic routines that help to transfer information between elements within computer 802, such as during start-up, may be stored in memory 806. Memory 806 typically also contains data and/or program modules that are immediately accessible to and/or presently being operated on by processing unit 804. By way of example, and not limitation, memory 806 may also include an operating system, application programs, other program modules, and program data.

The computer 802 may also include other removable/non-removable, volatile/nonvolatile computer storage media. For example, computer 802 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 808 through a non-removable memory interface such as an interface, and a magnetic disk drive or optical disk drive is typically connected to the system bus 808 by a removable memory interface, such as an interface.

A user can enter commands and information into the computer 802 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 804 through user input 810 and associated interface(s) that are coupled to the system bus 808, but may be connected by other interface and bus structures, such as a parallel port, game port, or a universal serial bus (USB). A graphics subsystem can also be connected to the system bus 808. A projection unit in a projection display device, or a heads up display (HUD) in a viewing device or other type of display device can also be connected to the system bus 808 via an interface, such as output interface 812, which may in turn communicate with video memory. In addition to a monitor, computers can also include other peripheral output devices such as speakers which can be connected through output interface 812.

The computer 802 can operate in a networked or distributed environment using logical connections to one or more other remote computer(s), such as remote computer 870, which can in turn have media capabilities different from computer 802. The remote computer 870 can be a personal computer, a server, a router, a network personal computer (PC), a peer device, personal digital assistant (PDA), cell phone, handheld computing device, a projection display device, a viewing device, or other common network node, or any other remote media consumption or transmission device, and may include any or all of the elements described above relative to the computer 802. The logical connections depicted in FIG. 8 include a network 816, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 802 can be connected to the LAN through a network interface 818 or adapter. When used in a WAN networking environment, the computer 802 can typically include a communications component, such as a modem, or other means for establishing communications over the WAN, such as the Internet. A communications component, such as wireless communications component, a modem and so on, which can be internal or external, can be connected to the system bus 808 via the user input interface of user input 810, or other appropriate mechanism. In a networked environment, program modules depicted relative to the computer 802, or portions thereof, can be stored in a remote memory storage device. It will be appreciated that the network connections shown and described are exemplary and other means of establishing a communications link between the computers can be used.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Reference throughout this specification to "one embodiment", "an embodiment", "a disclosed aspect", or "an aspect" means that a particular feature, structure, or characteristic described in connection with the embodiment or aspect is included in at least one embodiment or aspect of the present disclosure. Thus, the appearances of the phrase "in one embodiment", "in one aspect", or "in an embodiment" in various places throughout this specification are not necessarily all referring to the same embodiment. Furthermore, the particular features, structures, or characteristics may be combined in any suitable manner in various disclosed embodiments.

As utilized herein, terms "component", "system", "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, and so on) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. In an example, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. A computer system, comprising:
   a first prefetcher component communicatively coupled to a processor, the first prefetcher component configured for sending a prefetch request to a memory controller; and
   a second prefetcher component located within and communicatively coupled to the memory controller, the second prefetcher component configured for accessing prefetch data based on the prefetch request and storing the prefetch data in a prefetch cache of the memory controller, wherein prior to receiving the prefetch request from the first prefetcher component, the second prefetcher component is further configured for retrieving the prefetch data and storing the prefetch data in a memory of the second prefetcher component, wherein the prefetch data is moved from the memory of the second prefetcher component to the prefetch cache of the memory controller based on a receipt of the prefetch request.

2. The computer system of claim 1, wherein the first prefetcher component is further configured for determining a stride prefetch and locking onto access patterns based on the stride prefetch.

3. The computer system of claim 1, wherein the first prefetcher component is further configured for determining a cost of performing a prefetch operation based on the prefetch request, independent of another determination performed by the second prefetcher component.

4. The computer system of claim 1, wherein the second prefetcher component is further configured for determining a cost of performing a prefetch operation based on the prefetch request, independent of another determination performed by the first prefetcher component.

5. The computer system of claim 1, wherein the first prefetcher component is further configured for determining the prefetch request based on local resources and a cost of sending the prefetch request over an interconnect.

6. The computer system of claim 1, wherein the second prefetcher component is further configured for determining a cost of prefetching to a local cache associated with the memory controller based on a cache capacity of the memory controller, a remaining capacity of the local cache, a memory constraint, or a combination thereof.

7. The computer system of claim 1, wherein the second prefetcher component is further configured for conducting one or more prefetch operations based on prefetch hints attached to regular memory loads from the processor.

8. The computer system of claim 1, further comprising a third prefetcher component communicatively coupled to another memory controller, the third prefetcher component configured for accessing other prefetch data based on a second prefetch request from the first prefetcher component, the third prefetcher component further configured for storing the other prefetch data in another prefetch cache of the other memory controller.

9. The computer system of claim 1, wherein the first prefetcher component is configured for attaching prefetch hint information to the prefetch request, wherein the prefetch hint information comprises stride information and data related to a determined number of reads.

10. A prefetch method comprising:
receiving, by a slave prefetch component located in a memory controller, a prefetch request from a master prefetch component located in a processor;
accessing, by the slave prefetch component, prefetch data based on the prefetch request;
storing, by the slave prefetch component, the prefetch data in a prefetch cache of the memory controller;
prior to receiving the prefetch request to the master prefetch component, retrieving, by the slave prefetch component, the prefetch data based on a previous prefetch hint;
storing, by the slave prefetch component, the prefetch data in a memory of the slave prefetch component; and
after receiving the prefetch request from the master prefetch component, moving, by the slave prefetch component, the prefetch data from the memory of the slave prefetch component to the prefetch cache of the memory controller.

11. The prefetch method of claim 10, further comprising:
determining, by the slave prefetch component, a prefetch stride based on an address hit or an address miss; and
locking onto access patterns, by the slave prefetch component, based on the prefetch stride.

12. The prefetch method of claim 10, further comprising:
independently determining, by the slave prefetch component, a cost of performing a prefetch operation based on the prefetch request.

13. The prefetch method of claim 10, further comprising:
determining, by the slave prefetch component, the prefetch request based on local resources and a cost of sending the prefetch request over an interconnect.

14. The prefetch method of claim 10, further comprising:
determining, by the slave prefetch component, a cost of prefetching to a local cache associated with the memory controller based on a cache capacity of the memory controller, a remaining capacity of the local cache, a memory constraint, or a combination thereof.

15. The prefetch method of claim 10, further comprising:
receiving, by the slave prefetch component, prefetch hint information associated with the prefetch request, wherein the prefetch hint information comprises stride information and data related to a number of reads to fetch in additional to a current read.

16. An integrated circuit, comprising:
a first prefetcher component communicatively coupled to a processor, the first prefetcher component configured for sending prefetch requests to a memory controller; and
a second prefetcher component communicatively coupled to, and located in, the memory controller, the second prefetcher component configured for accessing prefetch data based on at least one prefetch request of the prefetch requests and storing the prefetch data in a prefetch cache of the memory controller,
wherein prior to receiving the prefetch request from the first prefetcher component, the second prefetcher component is further configured for retrieving the prefetch data and storing the prefetch data in a memory of the second prefetcher component, wherein the prefetch data is moved from the memory of the second prefetcher component to the prefetch cache of the memory controller based on a receipt of the prefetch request.

17. The integrated circuit of claim 16, further comprising:
a third prefetcher component communicatively coupled to another memory controller, the third prefetcher component configured for accessing other prefetch data based on a second prefetch request of the prefetch requests, the third prefetcher component further configured for storing the other prefetch data in another prefetch cache of the other memory controller.

18. The integrated circuit of claim 16, wherein the first prefetcher component further configured for determining a cost of performing a prefetch operation based on the prefetch requests independent of another determination performed by the second prefetcher component.

* * * * *